United States Patent
Miyamoto

(10) Patent No.: US 10,310,786 B2
(45) Date of Patent: Jun. 4, 2019

(54) PRINT CONTROL APPARATUS FOR CONTROLLING PRINT JOBS HAVING PRINT FUNCTIONS AFFECTING PAGE ORDER

(71) Applicant: Shikou Miyamoto, Kanagawa (JP)

(72) Inventor: Shikou Miyamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/921,710

(22) Filed: Mar. 15, 2018

(65) Prior Publication Data

US 2018/0267754 A1    Sep. 20, 2018

(30) Foreign Application Priority Data

Mar. 17, 2017 (JP) ................. 2017-053157
Feb. 6, 2018 (JP) ................. 2018-019558

(51) Int. Cl.
  *G06F 3/12*    (2006.01)
(52) U.S. Cl.
  CPC ............ *G06F 3/1248* (2013.01); *G06F 3/122* (2013.01); *G06F 3/1227* (2013.01)
(58) Field of Classification Search
  CPC .... G06F 3/1221; G06F 3/1244; G06F 3/1248; G06F 3/1252; G06F 3/1285; G06F 3/122; G06F 3/12227; G06K 15/1807; G06K 15/1813; G06K 15/1836; G06K 15/404; H04N 1/0032; H04N 1/00639; H04N 2201/0094
  USPC .......................................... 358/1.1–1.18, 498
  See application file for complete search history.

(56) References Cited

U.S. PATENT DOCUMENTS

| 10,038,824 | B1 * | 7/2018 | Das ..................... H04N 1/6008 |
| 2002/0048041 | A1 * | 4/2002 | Housel .................. B41J 11/485 358/1.15 |
| 2013/0194595 | A1 * | 8/2013 | Murata ............. G06K 15/4065 358/1.9 |
| 2015/0055171 | A1 * | 2/2015 | Joo .......................... G06F 3/00 358/1.15 |
| 2017/0103288 | A1 * | 4/2017 | Matsushita ........... G06F 3/1211 |
| 2018/0181349 | A1 * | 6/2018 | Condon .................. G06F 3/121 |

FOREIGN PATENT DOCUMENTS

JP    2006-259998    9/2006

* cited by examiner

*Primary Examiner* — Gabriel I Garcia

(74) *Attorney, Agent, or Firm* — Oblon, McClelland, Maier & Neustadt, L.L.P.

(57) ABSTRACT

A print control apparatus includes circuitry to receive a print job from a terminal device connected to the print control apparatus via a network, determine whether the print job is set with a specific printing function that performs a printing operation of the print job on recording media with a page order that is different from an initial page order described in page description language, determine page data to be arranged on virtual sheets when the print job is set with the specific printing function, generate raster images, corresponding to the page data, to be arranged on the virtual sheets from print data included in the print job, arrange the generated raster images on the virtual sheets based on the page order different from the initial page order, and control an operation of printing the virtual sheets, each arranged with the generated raster images, on the recording media.

7 Claims, 9 Drawing Sheets

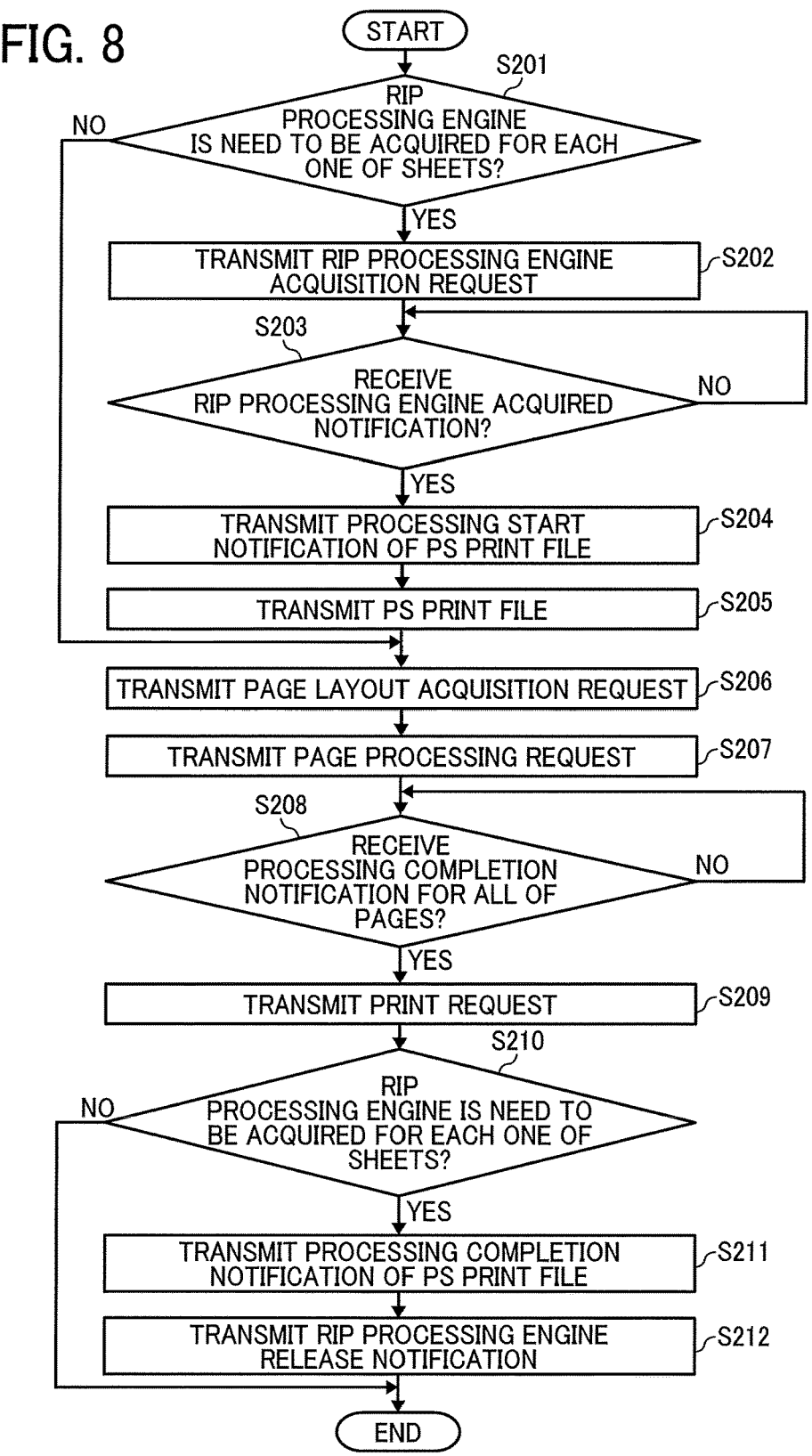

PRINT CONTROL APPARATUS FOR CONTROLLING PRINT JOBS HAVING PRINT FUNCTIONS AFFECTING PAGE ORDER

CROSS-REFERENCE TO RELATED APPLICATION

This application claims priority pursuant to 35 U.S.C. § 119(a) to Japanese Patent Application Nos. 2017-053157, filed on Mar. 17, 2017 and 2018-019558, filed on Feb. 6, 2018 in the Japan Patent Office, the disclosure of which is incorporated by reference herein in its entirety.

BACKGROUND

Technical Field

This disclosure relates to a print control apparatus, a printing control method, and a storage medium.

Background Art

Various printing functions such as a saddle stitching printing function, a flat binding printing function, a speed imposition printing function, and a reverse order printing function are known. In these printing functions, pages are printed in a sequence different from the sequential order of pages described in page description language (PDL) so that the pages are arranged in the order desired for a user after performing post-processing such as folding. The saddle stitching printing function is also called as a booklet printing function. Further, the flat binding printing function is also called as a bookbinding printing function or a magazine printing function.

When the saddle stitching printing function is used, a plurality of recording media (hereinafter also referred to as "recording sheets") printed on both side (e.g. each side face is printed with two-page data) is stacked, and then the plurality of recording media is folded at the center folding line together to form one booklet. When the flat binding printing function is used, each one of a plurality of recording media printed on both side faces is folded in half, and then the plurality of recording media is bundled to form a single booklet. When the speed imposition printing function is used, a plurality of recording media printed on both side faces is stacked, cut into halves, and then two pieces of cut halves are stacked to form a booklet. When the reverse order printing function is used, printing is performed from the last page to the first page. When each side face is printed with two-page data, it is referred to as "2-up" or "2 in 1."

Further, printing apparatuses, which perform the saddle stitch printing function and the flat binding printing function for a print job including a print file having pages described in page description language (PDL) such as PostScript, are known.

In the above described conventional arts, printing may fail depending on a relationship between a size of raster images generated by a raster image processor (RIP) processing of the print file included in the print job and a storage capacity of a storage device such as a hard disk drive (HDD).

For example, conventional arts perform the saddle stitch printing as illustrated in FIG. 1, in which the saddle stitch printing is performed on three sheets such as a first sheet 101, a second sheet 102 and a third sheet 103 by arranging ten pages of raster images on the sheets 101, 102 and 103. In this example case, raster images of pages 1 and 2 are arranged on the first sheet 101. Further, raster images of pages 3 and 4 and raster images of pages 9 and 10 are arranged on the second sheet 102. Similarly, raster images of pages 5 and 6 and raster images of pages 7 and 8 are arranged on the third sheet 103.

When the saddle stitch printing is performed by using the conventional arts, the following steps S1 and S2 are performed as illustrated in FIG. 2 because the RIP processing can be performed only in the order from the first page when PostScript language specification is used.

Step S1: raster images of pages 1 to 4 are generated by assuming that the raster images of pages 1 to 4 are to be arranged on the first sheet 101, and stored in a storage device. Similarly, raster images of pages 5 to 8 are generated by assuming that the raster images of pages 5 to 8 are to be arranged on the second sheet 102, and stored in the storage device. Similarly, raster images of pages 9 and 10 are generated by assuming that the raster images of pages 9 and 10 are to be arranged on the third sheet 103, and stored in the storage device.

Step S2: Then, from among the raster images stored in the storage device, the raster images of pages 1 and 2 are arranged on the first sheet 101 and printed. Similarly, from among the raster images stored in the storage device, the raster images of pages 3 and 4 and the raster images of pages 9 and 10 are arranged on the second sheet 102 and printed. Similarly, from among the raster images stored in the storage device, the raster images of pages 5 and 6 and the raster images of pages 7 and 8 are arranged on the third sheet 103 and printed.

Thus, in conventional arts, it is necessary to store the raster images of all pages in the storage device in step S1. For this reason, the storage device requires a storage capacity that can store the raster images of all pages. If the storage capacity is not sufficient to store the raster images of all pages, the printing operation may fail.

SUMMARY

As one aspect of the present invention, a print control apparatus is devised. The print control apparatus includes circuitry to receive a print job from a terminal device connected to the print control apparatus via a network, determine whether the print job is set with a specific printing function that performs a printing operation of the print job on one or more recording media with a page order that is different from an initial page order described in page description language, determine one or more page data to be arranged on one or more virtual sheets, the one or more virtual sheets corresponding to the one or more recording media one-to-one basis, when the print job is determined to set with the specific printing function, generate one or more raster images, corresponding to the one or more page data one-to-one basis, to be arranged on the one or more virtual sheets from print data included in the print job, arrange the generated one or more raster images on the one or more virtual sheets based on the page order different from the initial page order described in the page description language, and control an operation of printing the one or more virtual sheets, each arranged with the generated one or more raster images corresponding to the one or more page data one-to-one basis, on the one or more recording media.

As another aspect of the present invention, a method of controlling a printing operation is devised. The method includes receiving a print job from a terminal device connected to the print control apparatus via a network, determining whether the print job is set with a specific printing function that performs a printing operation of the print job on one or more recording media with a page order that is different from an initial page order described in page description language, determining one or more page data to be arranged on one or more virtual sheets, the one or more virtual sheets corresponding to the one or more recording media one-to-one basis, when the print job is determined to set with the specific printing function, generating one or more raster images, corresponding to the one or more page data one-to-one basis, to be arranged on the one or more virtual sheets from print data included in the print job, arranging the generated one or more raster images on the one or more virtual sheets based on the page order different from the initial page order described in the page description language, and controlling an operation of printing the one or more virtual sheets, each arranged with the generated one or more raster images corresponding to the one or more page data one-to-one basis, on the one or more recording media.

As still another aspect of the present invention, a non-transitory storage medium storing one or more instructions that, when executed by one or more processors, cause the one or more processors to execute a method of controlling a printing operation is devised. The method includes receiving a print job from a terminal device connected to the print control apparatus via a network, determining whether the print job is set with a specific printing function that performs a printing operation of the print job on one or more recording media with a page order that is different from an initial page order described in page description language, determining one or more page data to be arranged on one or more virtual sheets, the one or more virtual sheets corresponding to the one or more recording media one-to-one basis, when the print job is determined to set with the specific printing function, generating one or more raster images, corresponding to the one or more page data one-to-one basis, to be arranged on the one or more virtual sheets from print data included in the print job, arranging the generated one or more raster images on the one or more virtual sheets based on the page order different from the initial page order described in the page description language, and controlling an operation of printing the one or more virtual sheets, each arranged with the generated one or more raster images corresponding to the one or more page data one-to-one basis, on the one or more recording media.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 8 is a flowchart illustrating an example of steps executed by an object management unit and a sheet object when a saddle stitching printing function of the embodiment is performed.

Figure 1:
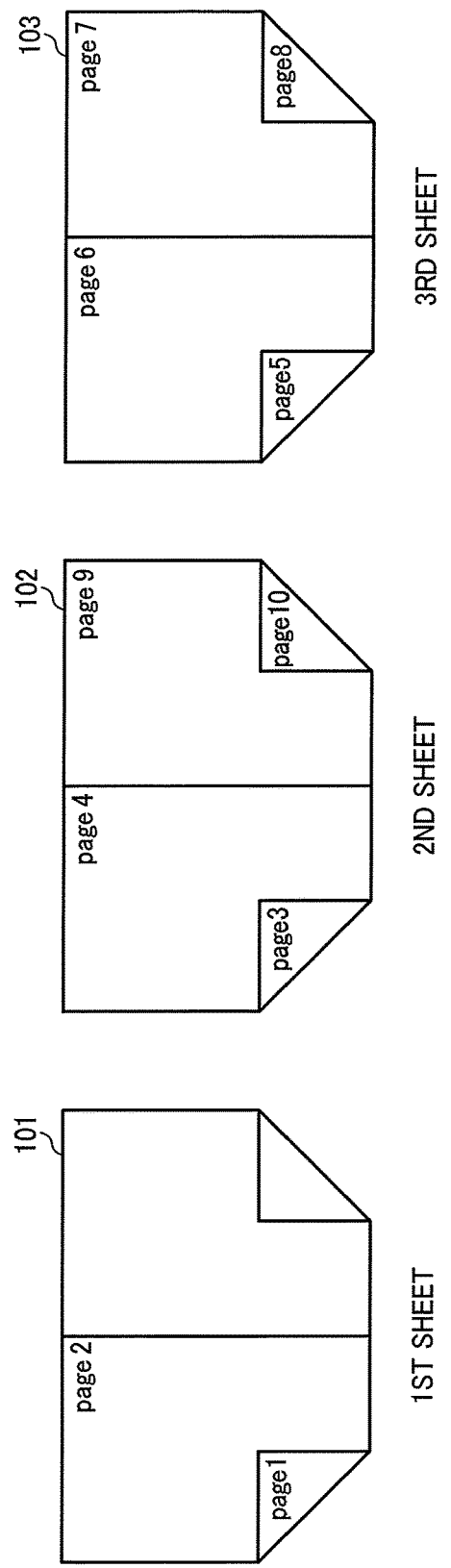
FIG. 1 illustrates an example of imposition of pages by using a saddle stitching printing function.
Figure 2:
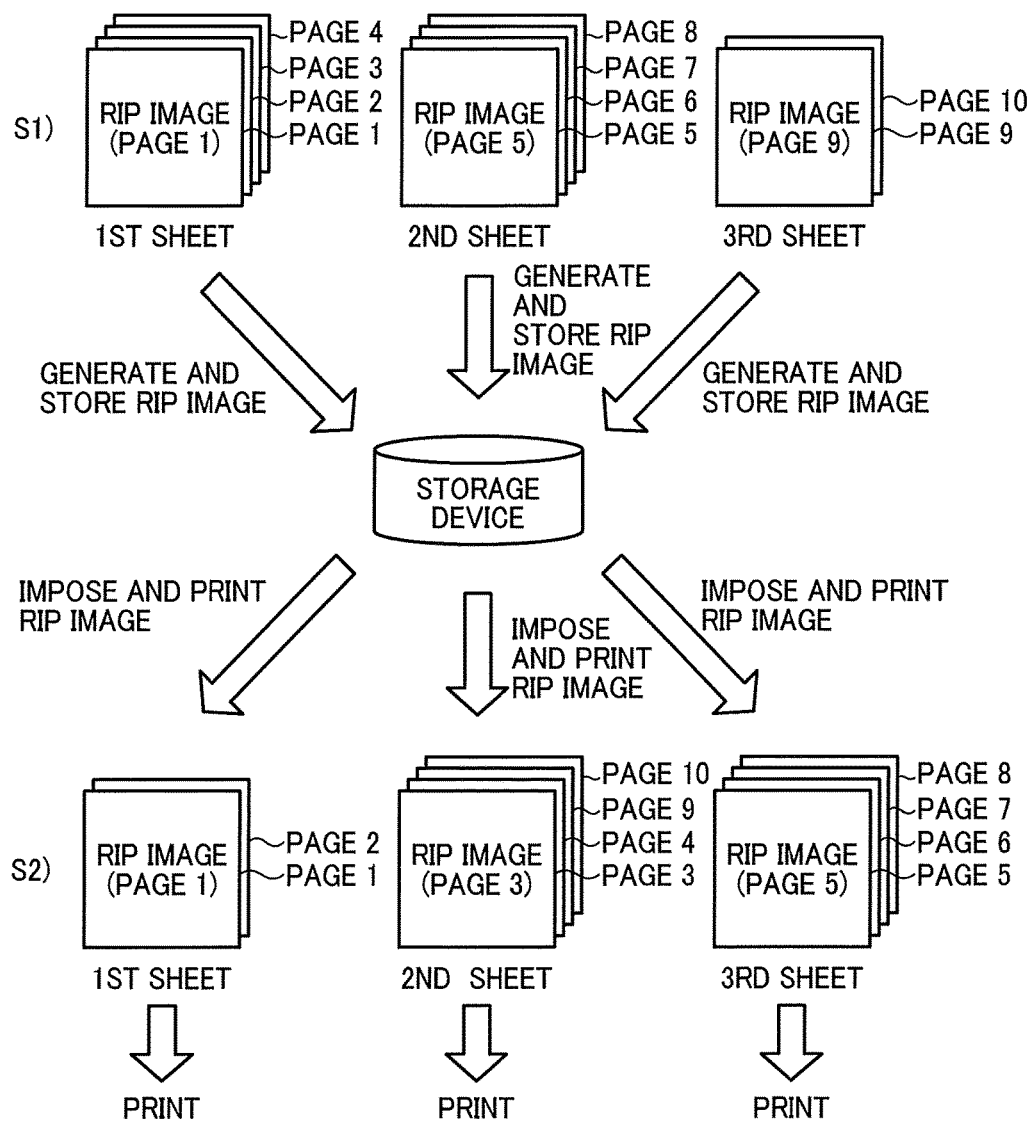
FIG. 2 is a diagram of a method of printing images by using a saddle stitching printing function of conventional arts.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

Hereinafter, a description is given of one or more embodiments of the present invention in detail with reference to the drawings.

Figure 3:
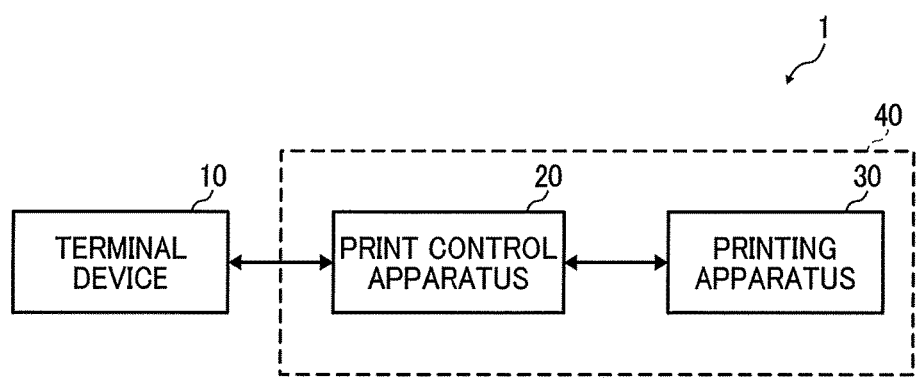
FIG. 3 illustrates an example of a schematic configuration of a printing system of an embodiment.

Configuration of Printing System:

First, a description is given of a schematic configuration of a printing system 1 of an embodiment of the present invention with reference to FIG. 3. FIG. 3 illustrates an example of a schematic configuration of the printing system 1.

As illustrated in FIG. 3, the printing system 1 includes, for example, one or more terminal devices 10, a print control apparatus 20, and a printing apparatus 30. The terminal device 10 and the print control apparatus 20 are communicably connected via a network, such as a local area network (LAN). Further, the print control apparatus 20 and the printing apparatus 30 can be communicably connected with each other via a communication line, such as a dedicated line.

As above described, the terminal device 10 and the print control apparatus 20 can be connected via the LAN, but not limited thereto. The terminal device 10 and the print control apparatus 20 can be connected using any types of communication standards. Further, the terminal device 10 and the print control apparatus 20 can be connected with each other wirelessly, by wire, or by a combination of wireless and wired communication. Further, the connection between the print control apparatus 20 and the printing apparatus 30 is not limited to the dedicated lines. For example, the print control apparatus 20 and the printing apparatus 30 can be connected with each other via a network, such as a LAN Further, the terminal device 10 is, for example, a personal computer (PC), but not limited thereto. The terminal device 10 is installed with one or more applications used for creating "print target data" such as document data and image data, which are used as target data of printing (print target data). The terminal device 10 executes one or more applications based on a print setting operation and a print instruction operation to generate a print job including a print file described in any page description language (PDL) and the print setting information, and transmits the generated print job to the print control apparatus 20. The print file includes, for example, drawing commands of characters and figures, and attributes, drawing positions and scales of characters and shapes in pages described in PDL. Further, the print setting information includes, for example, information indicating a printing function set by a user (e.g., saddle stitch printing function, flat binding printing function, speed imposition printing function, reverse order printing function), information indicating a tray and a stacker to which printed matters are output, and information indicating the number of printing copies, or the like.

Hereafter, it is assumed that the PDL uses, for example, PostScript. Further, a print file described in PostScript is referred to as "PS print file."

Further, in the embodiment, for example, a user of the terminal device 10 performs print setting operation for performing the saddle stitching printing function, and then performs a print instruction operation. In this description, the saddle stitch printing function is exemplary described as the printing function, but the printing function is not limited to the saddle stitch printing function. For example, the user of the terminal device 10 can perform the print setting operation to implement the various printing functions such as the flat binding printing function, the speed imposition printing function, and the reverse order printing function, and then the user perform the print instruction operation.

The terminal device 10 may employ various types of information processing apparatuses such as smartphones, tablet devices, cellular phones, electronic information blackboards, or the like.

The print control apparatus 20 is, for example, a digital front end (DFE). When the print control apparatus 20 receives a print job from the terminal device 10, the print control apparatus 20 performs RIP processing on the PS print file included in the print job. In this processing, the print control apparatus 20 generates, for each sheet, one or more RIP images (i.e., raster images) to be arranged on each sheet.

Then, the print control apparatus 20 transmits the generated RIP image and the print setting information to the printing apparatus 30. As described above, the print control apparatus 20 generates the one or more RIP images to be arranged on each sheet, and transmits the generated one or more RIP image to the printing apparatus 30. With this processing, the printing apparatus 30 prints the one or more RIP images generated and arranged by the print control apparatus 20 on each sheet. Hereinafter, the term of "RIP image" may indicate one or more RIP images, and the RIP image may be also referred to as the raster image.

The printing apparatus 30 is an image processing apparatus having an image processing engine such as a plotter. After the printing apparatus 30 receives the RIP image and the print setting information from the print control apparatus 20, the print apparatus 30 prints the RIP image on the recording medium such as paper based on the print setting information. As a result, the RIP image is printed on the recording medium, and output as a printed matter. The recording medium is not limited to paper. The recording medium may be, for example, coated paper, cardboard, overhead projector (OHP) sheet, plastic film, prepreg, copper foil, or the like.

The schematic configuration of the printing system 1 illustrated in FIG. 3 is one example, and the schematic configuration of the printing system 1 can be configured differently. For example, the number ratio of the print control apparatus 20 and the printing apparatus 30 is not limited to one to one. For example, a plurality of printing apparatuses 30 may be connected to one control apparatus 20. Further, the print control apparatus 20 and the printing apparatus 30 may be implemented as one image processing apparatus 40.

Figure 4:
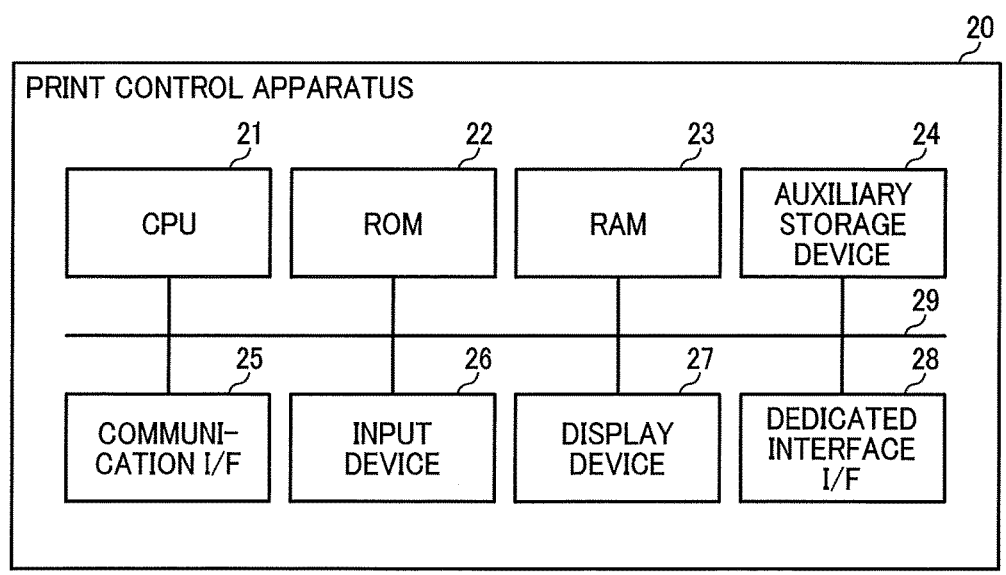
FIG. 4 illustrates an example of a hardware block diagram of a print control apparatus used in the printing system of FIG. 3.

Hardware Configuration:

Hereinafter, a description is given of a hardware configuration of the print control apparatus 20 with reference to FIG. 4. FIG. 4 illustrates an example of a hardware block diagram of the print control apparatus 20.

As illustrated in FIG. 4, the print control apparatus 20 includes, for example, a central processing unit (CPU) 21, a read only memory (ROM) 22, a random access memory (RAM) 23, and an auxiliary storage device 24. The print control apparatus 20 further includes, for example, a communication interface (I/F) 25, an input device 26, a display device 27, and a dedicated interface I/F 28. These hardware resources are connected to each other by a bus 29.

The input device 26 is, for example, a keyboard, a mouse, a touch panel, or the like that is used for inputting various operations. The display device 27 is a display, such as liquid crystal display (LCD), which displays various processing results. Further, the print control apparatus 20 may omit at least one of the input device 26 and the display device 27.

The RAM 23 is a volatile semiconductor memory that temporarily stores programs and data. The ROM 22 is a nonvolatile semiconductor memory that can store data even when the power is turned off.

The auxiliary storage device 24 is, for example, a hard disk drive (HDD), a solid state drive (SSD), or the like, and is a nonvolatile storage device that stores programs and data. The programs and data stored in the auxiliary storage device 24 include, for example, a basic software such as operating system (OS) for controlling the print control apparatus 20, various applications operable on the OS, and programs for implementing processing of the embodiment.

The CPU 21 is circuitry or one or more processors that reads programs and data from, for example, the auxiliary storage device 24 and ROM 22, and executes programs and data on the RAM 23. The communication I/F 25 is an interface to perform data communication with the terminal device 10. The print control apparatus 20 receives a print job or the like from the terminal device 10 via the communication I/F 25.

The dedicated I/F 28 is an interface to perform data communication with the printing apparatus 30. The print control apparatus 20 transmits a print job or the like to the printing apparatus 30 via the dedicated I/F 28.

The print control apparatus 20 having the hardware configuration illustrated in FIG. 4 can implement various processes to be described later.

Further, the terminal device 10 employs the same hardware configuration as the print control apparatus 20 except that the terminal device 10 does not include the dedicated I/F 28. Further, the printing apparatus 30 employs a hardware configuration similar to that of the print control apparatus 20 except that the printing apparatus 30 does not include the communication I/F 25 but includes an image processing engine such as a plotter.

Figure 5:
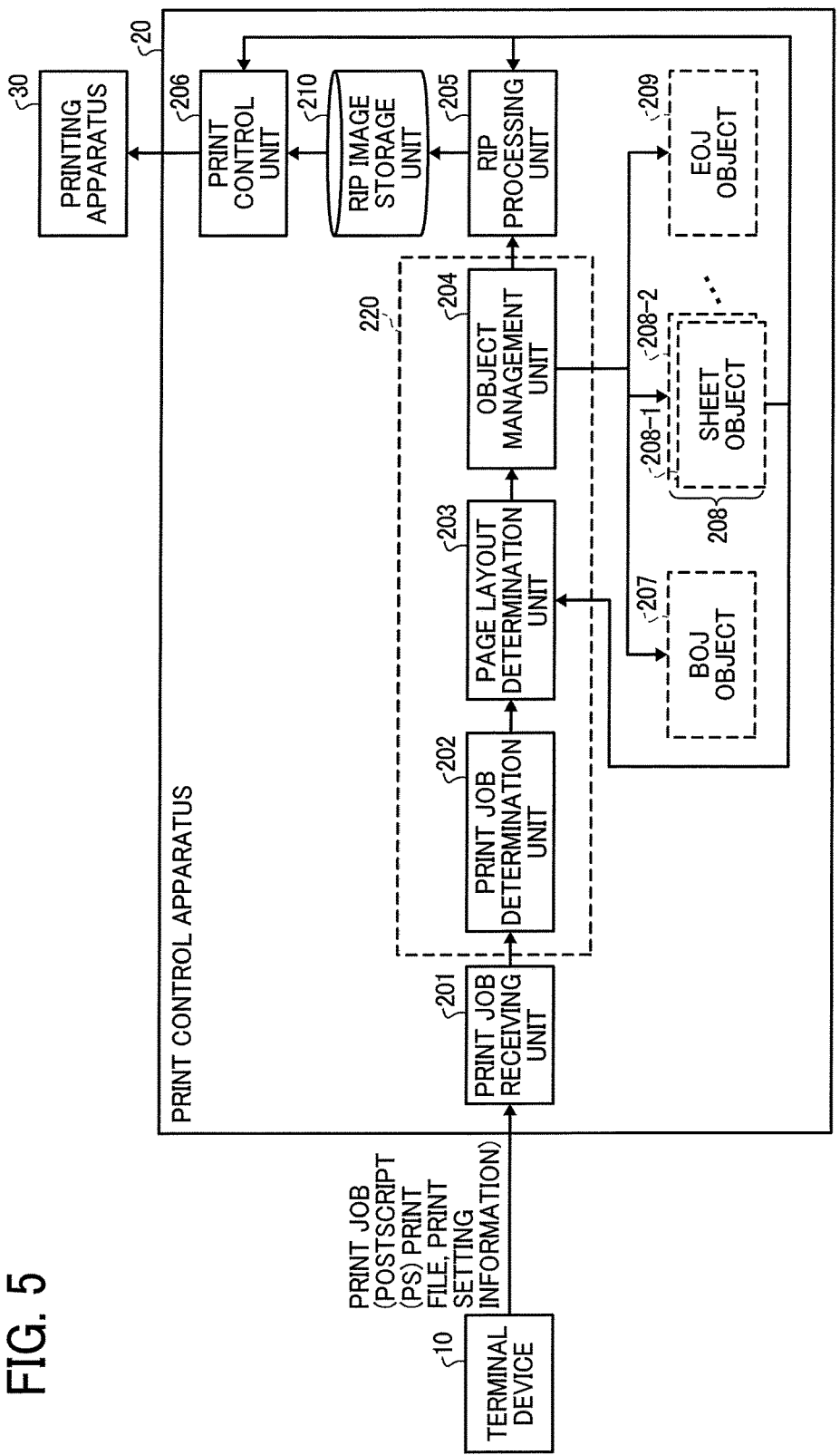
FIG. 5 illustrates an example of a functional block diagram of a print control apparatus used in the printing system of FIG. 3.

Functional Configuration:

Hereinafter, a description is given of a functional configuration of the print control apparatus 20 with reference to FIG. 5. FIG. 5 illustrates an example of the functional block diagram of the print control apparatus 20 of the embodiment.

As illustrated in FIG. 5, the print control apparatus 20 includes, for example, a print job receiving unit 201, a print job determination unit 202, a page layout determination unit 203, an object management unit 204, a RIP processing unit 205, and a print control unit 206. These units are implemented by executing one or more programs installed in the print control apparatus 20 by the CPU 21.

Further, as illustrated in FIG. 5, the print control apparatus 20 includes, for example, a RIP image storage unit 210. The RIP image storage unit 210 can be implemented by using, for example, a storage device such as the RAM 23 and/or the auxiliary storage device 24.

The print job receiving unit 201 receives a print job generated by the terminal device 10. The print job determination unit 202 determines whether the printing function of the saddle stitching printing function, the flat binding printing function, the speed imposition printing function, or the reverse order printing function is set based on the print setting information included in the print job received by the print job receiving unit 201.

The page layout determination unit 203 determines a layout of pages on each sheet (i.e., imposition of pages on each sheet) in accordance with the printing function determined by the print job determination unit 202.

For example, when printing data to be printed on ten (10) pages is printed by using the saddle stitch printing function, the ten pages are arranged on each sheet as illustrated in FIG. 1. In the following description, it is assumed that pages arranged on each sheet is described in the following order: a page is arranged on the back of the left side of each sheet, a page is arranged on the front of the left side of each sheet, a page is arranged on the front of the right side of each sheet, and a page is arranged on the back of the right side of each sheet. Further, "-" indicates that no page is arranged on each sheet.

Saddle Stitch Printing:
　First sheet: page 1, page 2, -, -
　Second sheet: page 3, page 4, page 9, page 10
　Third sheet: page 5, page 6, page 7, page 8

Further, when printing data to be printed on the ten (10) pages is printed by using the flat binding printing function, the ten pages are arranged on each sheet as follows.

Flat Binding Printing:
　First sheet: page 1, page 2, page 3, page 4
　Second sheet: page 5, page 6, page 7, page 8
　Third sheet: page 9, page 10, -, -

Further, when printing data to be printed on the ten (10) pages is printed by using the speed imposition printing function, the ten pages are arranged on each sheet as follows.

Speed Imposition Printing:
　First sheet: page 8, page 7, page 1, page 2
　Second sheet: page 10, page 9, page 3, page 4
　Third sheet: -, -, page 5, page 6

Further, when printing data to be printed on the ten (10) pages is printed by using the reverse order printing function, the ten pages are arranged on each sheet as follows.

Reverse Order Printing:
　First sheet: page 10, -, -, page 9
　Second sheet: page 6, page 8, page 7, page 5
　Third sheet: page 2, page 4, page 3, page 1

The object management unit 204 manages each object used for performing the print processing of the print job. The object managed by the object management unit 204 includes, for example, a beginning of job (BOJ) object 207, a sheet object 208, and an end of job (EOJ) object 209.

The BOJ object 207 is an object indicating that the processing of the print job has been started. When the processing of the print job is started, the BOJ object 207 is generated and deleted by the object management unit 204.

The EOJ object 209 is an object indicating that the processing of print job has been completed. The EOJ object 209 is generated and deleted by the object management unit 204 when the print job is completed.

A period from the generation and deletion of the BOJ object 207 to the generation and the deletion of the EOJ object 209 corresponds to one print job.

The sheet object 208 is an object used for generating a RIP image to be applied to a predetermined sheet and for printing the predetermined sheet. The sheet object 208 transmits a request for processing data to the RIP processing unit 205 by designating information identifying each page (e.g., page number). Then, the RIP processing unit 205 generates the RIP image of each page. Further, the sheet object 208 also transmits a request for print control to the print control unit 206. In this configuration, the printing apparatus 30 is controlled by the print control apparatus 206, and each one of the sheets are printed by the printing apparatus 30.

When the RIP image to be imposed on the sheet is generated, the sheet object 208 is generated by the object management unit 204. Further, when the printing of sheet on a recording medium is completed, the sheet object 208 is deleted by the object management unit 204.

In the embodiment, the object management unit 204 generates and deletes the sheet object 208 for each one of sheets. Hereinafter, the sheet object 208 of the first sheet is represented by "sheet 1 object 208-1 (1st sheet object 208-1)," the sheet object 208 of the second sheet is represented by "sheet 2 object 208-2 (2nd sheet object 208-1)," and the sheet object 208 of the N-th sheet is represented by "sheet N object 208-N(N-th sheet object 208-N)."

The object managed by the object management unit 204 may include, for example, a BEGIN_PDL object and an END_PDL object. The BEGIN_PDL object and the END_PDL object respectively indicate the start and end of the processing when generating the RIP image of each page for one print file. The BEGIN_PDL and END_PDL objects are used, for example, in known arts.

The RIP processing unit 205 controls the RIP processing engine (i.e., raster image processing engine) based on a processing request received from the sheet object 208 to generate the RIP image of pages from the PS print file. Further, the RIP image generated by the RIP processing unit 205 is stored in the RIP image storage unit 210.

Further, a plurality of RIP processing engines may be used. In this case, the RIP processing unit 205 controls one or more RIP processing engines acquired by the sheet object 208 in advance from the plurality of RIP processing engines to generate the RIP image of pages.

The print control unit 206 controls the printing apparatus 30 based on a print request received from the sheet object 208, and prints each sheet arranged with the RIP image. For example, the print control unit 206 acquires one or more RIP images from the RIP image storage unit 210, and then the print control unit 206 impositions or arranges the acquired one or more RIP images on a virtual sheet, which is also referred to as "data sheet." Then, the print control unit 206 transmits a print request including the data sheet arranged with the one or more RIP images to the printing apparatus 30. As a result, the data sheet is printed on a recording medium such as paper by the printing apparatus 30.

The functional configuration of the print control apparatus 20 illustrated in FIG. 5 is just one example, and can be configured differently. For example, the print job determination unit 202, the page layout determination unit 203, and the object management unit 204 may be included in one functional unit such as a print management unit 220. Further, the objects such as the BOJ object 207, the sheet object 208, and the EOJ object 209 can be also included in the print management unit 220.

Figure 6A:
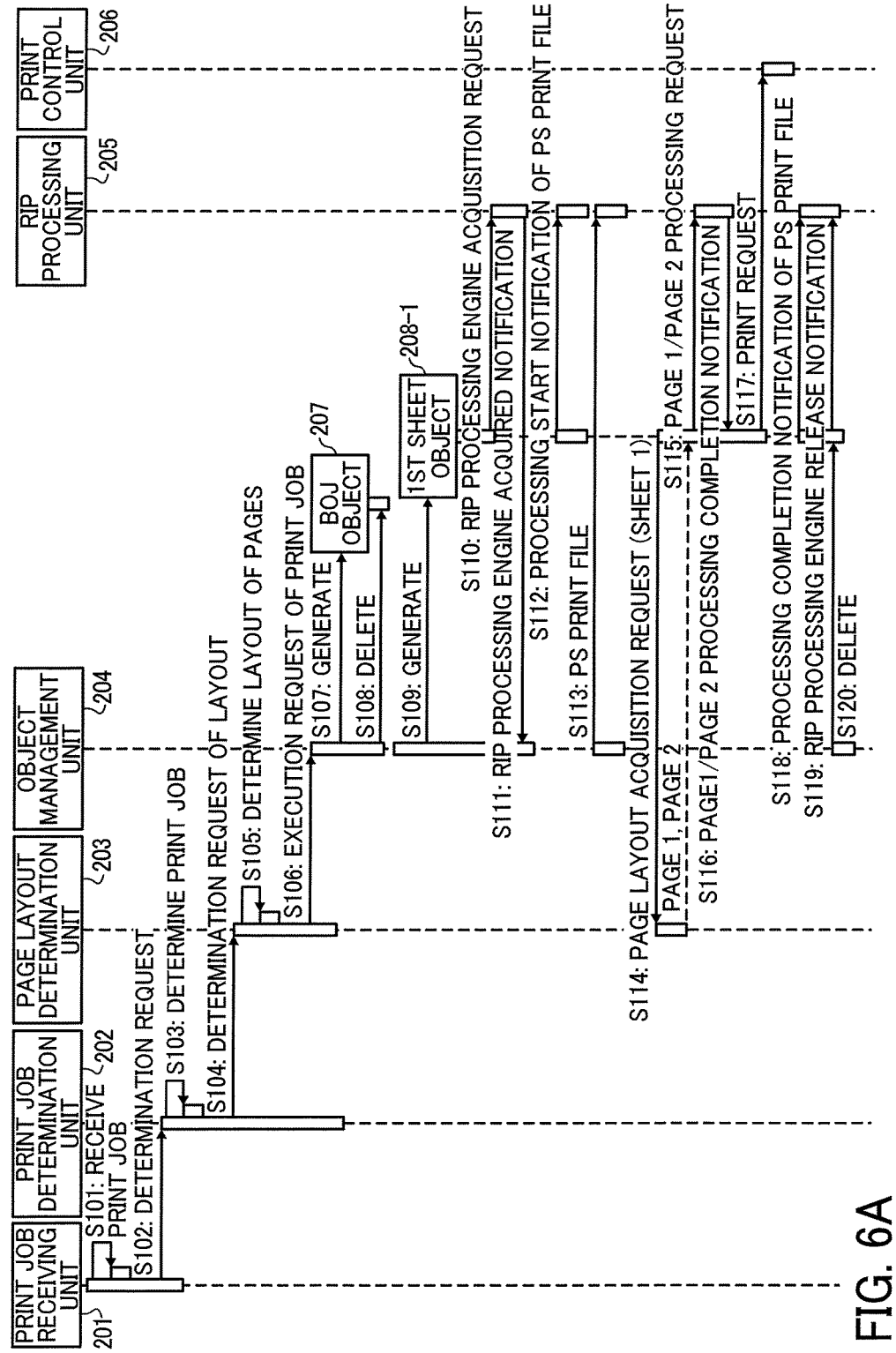
FIGS. 6A, 6B and 6C are a sequence diagram illustrating an example of a printing process by using a saddle stitching printing function of the embodiment.
Figure 6B:
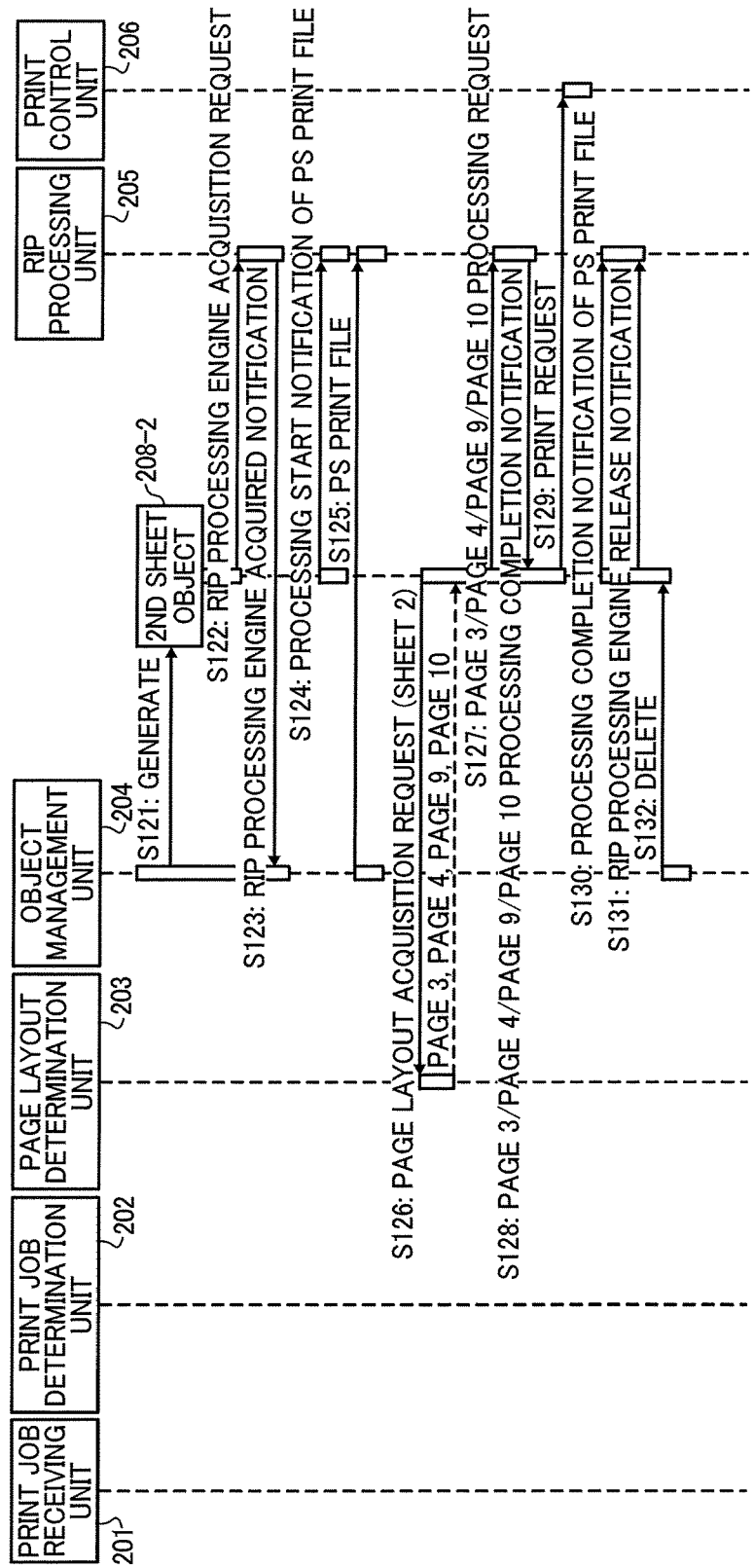
Figure 6C:
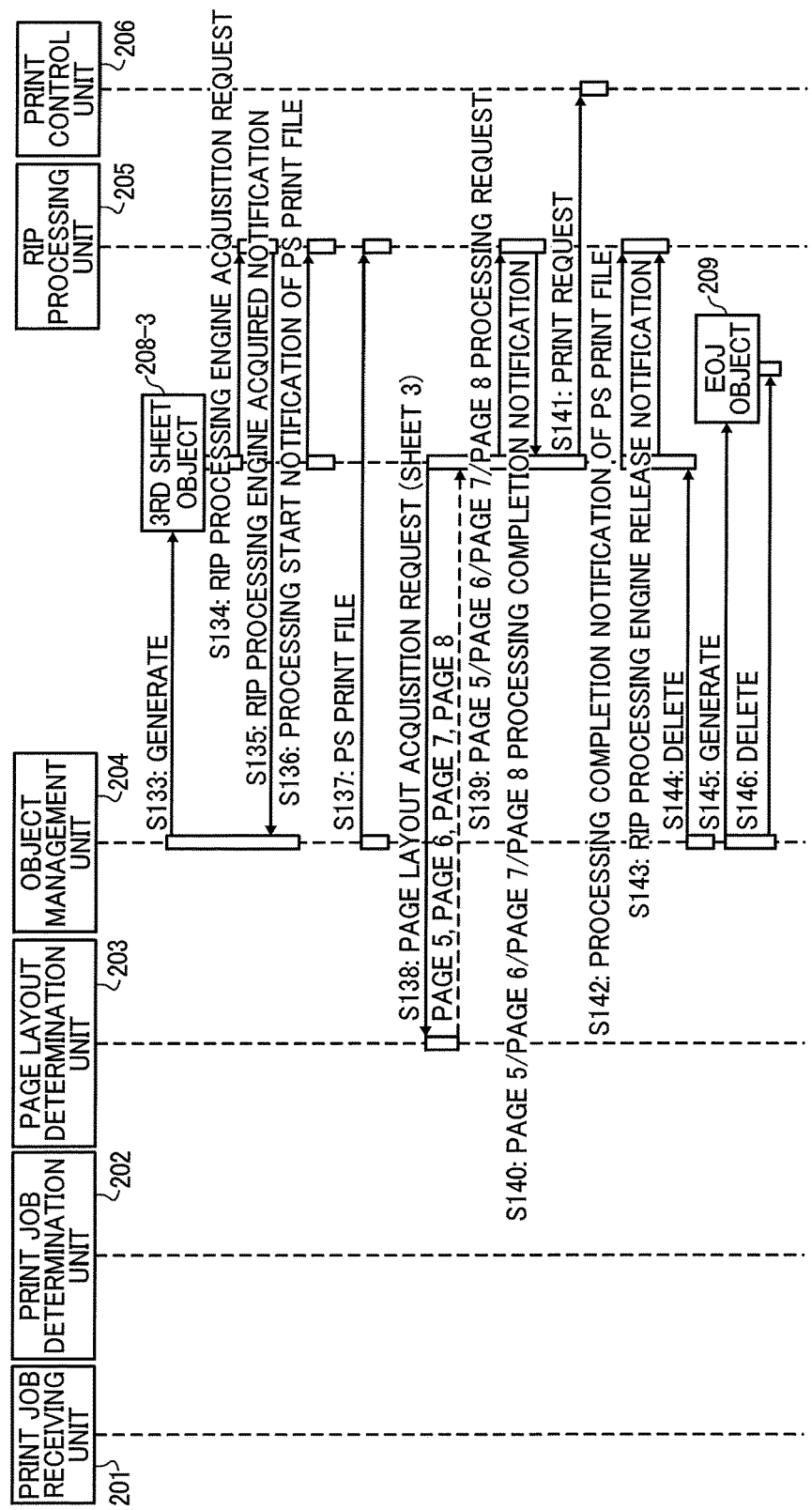

Details of Processing:

Hereinafter, a description is given of details of the processing performed by the print control apparatus 20 of the embodiment. Hereinafter, a description is given of an example case with reference to FIGS. 6A, 6B and 6C, in which the print control apparatus 20 controls the processing for printing print target data by using the saddle stitch printing function. FIGS. 6A, 6B and 6C are a sequence diagram illustrating an example of printing processing by using the saddle stitching printing function.

First, the print job receiving unit 201 receives a print job generated by the terminal device 10 (step S101).

Then, the print job receiving unit 201 transmits a determination request of the print job to the print job determination unit 202 (step 102). Further, the print job receiving unit 201 can be configured to store the print job received in step S101, for example, in the auxiliary storage device 24.

Then, the print job determination unit 202 determines whether any one of the printing functions such as the saddle stitching printing function, the flat binding printing function, the speed imposition printing function, and the reverse order printing function is set for the print job based on print setting information included in the print job received by the print job receiving unit 201 (step S103).

Then, the print job determination unit 202 transmits the determination request of one or more pages to be arranged on each sheet to the page layout determination unit 203 (step S104). Hereinafter, the processing is described by assuming that the saddle stitching printing function is set (i.e., information indicating the saddle stitching printing function is included in the print setting information) and determined in step S103.

Further, when the print job determination unit 202 determines in step S103 that none of the printing functions such as the saddle stitching printing function, the flat binding printing function, the speed imposition printing function, and the reverse order printing function is set for the print job, the pages are arranged in the order described in the PDL, and then printed. In this case, a standard printing process may be performed.

Then, the page layout determination unit 203 determines the layout of pages on each sheet (i.e., imposition of pages on each sheet) based on the printing function determined by the print job determination unit 202 (step S105). That is, as described above, the page layout determination unit 203 determines the pages to be arranged on each sheet as follows.

First sheet: page 1, page 2, -, -
Second sheet: page 3, page 4, page 9, page 10
Third sheet: page 5, page 6, page 7, page 8

Then, the page layout determination unit 203 transmits an execution request of the print job to the object management unit 204 (step S106).

Then, the object management unit 204 generates the BOJ object 207 (step S107), and then the object management unit 204 deletes the BOJ object 207 (step S108). With this configuration, the processing of the print job is started.

Processing of First Sheet:

Hereinafter, a description is given of a process of generating a RIP image of each page to be arranged on the first sheet and printing the first sheet arranged with the RIP images.

First, the object management unit 204 generates the sheet 1 object 208-1 (1st sheet object 208-1) (step S109). The generation of the sheet 1 object 208-1 starts the process of generating the RIP image of each page to be arranged on the first sheet, and printing the first sheet arranged with the RIP images.

The sheet 1 object 208-1 transmits a RIP processing engine acquisition request to the RIP processing unit 205 (step S110). For example, the sheet 1 object 208-1 transmits an acquisition request for acquiring all of available RIP processing engines to the RIP processing unit 205. However, the acquisition request is not limited thereto. For example, an acquisition request designating one available RIP processing engine may be transmitted to the RIP processing unit 205, or an acquisition request designating a specific RIP processing engine may be transmitted to the RIP processing unit 205.

When the RIP processing unit 205 receives the RIP processing engine acquisition request, the RIP processing unit 205 acquires at least one RIP processing engine corresponding to the acquisition request, and transmits the RIP processing engine acquired notification to the object management unit 204 (step S111). The RIP processing engine acquired notification includes, for example, information identifying the acquired RIP processing engine. The acquiring of RIP processing engine means that the RIP processing engine used for the processing is assigned for the processing requests received from the sheet object 208 (i.e., processing requests for generating RIP image).

Then, the sheet 1 object 208-1 transmits a processing start notification of the PS print file to the RIP processing unit 205, in which the processing start notification is regarded as an open notification of the PS print file (step S112).

Then, the object management unit 204 transmits the PS print file included in the print job to the RIP processing unit 205 (step S113).

Then, the sheet 1 object 208-1 transmits a page layout acquisition request for acquiring one or more pages to be arranged on the first sheet to the page layout determination unit 203 (step S114). The page layout acquisition request includes "sheet 1 (1st sheet)" indicating that the page number of the page(s) to be arranged on the first sheet is acquired. As a result, the page number of "page 1 and page 2" of the pages to be arranged on the first sheet is returned from the page layout determination unit 203.

Then, the sheet 1 object 208-1 transmits the processing request (i.e., page 1/page 2 processing request), designating the page number returned from the page layout determination unit 203, to the RIP processing unit 205 (step S115). The page 1/page 2 processing request is a request for generating the RIP image by designating the page numbers of "page 1" and "page 2." Further, the sheet 1 object 208-1 may transmit, for example, the page 1 processing request designating the page number "page 1," and the page 2 processing request designating the page number "page 2" to the RIP processing unit 205 separately or individually.

When the RIP processing unit 205 generates the RIP image (raster image) in response to the processing request received from the sheet 1 object 208-1, the RIP processing unit 205 transmits the page 1/page 2 processing completion notification to the sheet 1 object 208-1 (step S116). In step S116, the RIP image generated by the RIP processing unit 205 is stored in the RIP image storage unit 210. The page 1/page 2 processing completion notification indicates that the generation of the RIP image of the page 1 and the RIP image of the page 2 are completed. Further, the RIP processing unit 205 may transmit, for example, the page 1 processing completion notification indicating that the generation of the RIP image of the page 1 is completed, and the page 2 processing completion notification indicating that the generation of the RIP image of the page 2 is completed to the sheet 1 object 208-1 separately or individually.

When the sheet 1 object 208-1 receives the page 1/page 2 processing completion notification, the sheet 1 object 208-1 transmits a print request to the print control unit 206 (step S117). With this configuration, the printer 30 is controlled by the print control apparatus 206, and the first sheet is printed on a recording medium such as paper based on the print setting included in the print job. When this printing is performed, the RIP image of the page 1 on the back of the left side of the first sheet and the RIP image of the page 2 on the front of the left side of the first sheet are printed on the recording medium such as paper as a printed matter by the printing apparatus 30, and then the printed matter is output from the printing apparatus 30.

Then, the sheet 1 object 208-1 transmits a processing completion notification of the PS print file to the RIP processing unit 205, in which the processing completion notification of the PS print file is regarded as a close notification of the PS print file (step S118).

Then, the sheet 1 object 208-1 transmits the RIP processing engine release notification to the RIP processing unit 205 (step S119). With this configuration, the RIP processing engine acquired in step S111 is released (i.e., assignment of the RIP processing engine to the sheet 1 object 208-1 is canceled).

Then, the object management unit 204 deletes the sheet 1 object 208-1 (step S120). With this configuration, the process of generating the RIP image of each page to be arranged on the first sheet and printing the first sheet arranged with the RIP images are completed.

Further, various requests and notifications can be also used to verify the consistency of the sequence relationship. For example, if the object management unit 204 receives the RIP engine acquired notification before the RIP processing engine acquisition request is transmitted, an error occurs. Similarly, if the page 1/page 2 processing request is transmitted before the PS print file processing start notification is transmitted, an error occurs.

Processing of Second Sheet:

Hereinafter, a description is given of a process of generating a RIP image of each page to be arranged on the second sheet and printing the second sheet arranged with the RIP images. Since the processing of the second sheet is substantially the same as the processing of the first sheet, the description the second sheet is partially omitted or simplified.

First, the object management unit 204 generates the sheet 2 object 208-2 (2nd sheet object 208-2) (step S121). The generation of the sheet 2 object 208-2 starts the process of generating the RIP image of each page to be arranged on the second sheet, and printing the second sheet arranged with the RIP images.

The sheet 2 object 208-2 transmits a RIP processing engine acquisition request to the RIP processing unit 205 (step S122).

When the RIP processing unit 205 receives the RIP processing engine acquisition request, the RIP processing unit 205 acquires at least one RIP processing engine corresponding to the acquisition request, and transmits the RIP processing engine acquired notification to the object management unit 204 (step S123).

Then, the sheet 2 object 208-2 transmits the processing start notification of the PS print file to the RIP processing unit 205 (step S124).

Then, the object management unit 204 transmits the PS print file included in the print job to the RIP processing unit 205 (step S125).

Then, the sheet 2 object 208-2 transmits a page layout acquisition request for acquiring one or more pages to be arranged on the second sheet to the page layout determination unit 203 (step S126). The page layout acquisition request includes "sheet 2 (2nd sheet)" indicating that page number of the page(s) to be arranged on the second sheet is acquired. As a result, the page number "page 3, page 4, page 9, page 10" of the pages to be arranged on the second sheet is returned from the page layout determination unit 203.

Then, the sheet 2 object 208-2 transmits the processing request (i.e., page 3/page 4/page 9/page 10 processing request), designating the page number returned from the page layout determination unit 203 to the RIP processing unit 205 (step S127). As described above, the sheet 2 object 208-2 may transmit the processing request of the page to the RIP processing unit 205 for each page separately or individually.

When the RIP processing unit 205 generates the RIP image (raster image) in response to the processing request received from the sheet 2 object 208-2, the RIP processing unit 205 transmits the page 3/page 4/page 9/page 10 processing completion notification to the sheet 2 object 208-2 (step S128). As described above, the RIP processing unit 205 may transmit the page processing completion notification indicating that the generation of the RIP image of each page is completed for each one of pages to the sheet 2 object 208-2 separately or individually.

When the sheet 2 object 208-2 receives the page 3/page 4/page 9/page 10 processing completion notification, the sheet 2 object 208-2 transmits a print request to the print control unit 206 (step S129). With this configuration, the printer 30 is controlled by the print control apparatus 206, and the second sheet is printed on a recording medium such as paper based on the print setting included in the print job. When this printing is performed, the RIP image of page 3 on the back of the left side of the second sheet, the RIP image of the page 4 on the front of the left side of the second sheet, the RIP image of the page 9 on the front of the right side of the second sheet, and the RIP image of the page 10 on the back of the right side of the second sheet are printed on the recording medium as a printed matter by the printing apparatus 30, and then the printed matter is output from the printing apparatus 30.

Then, the sheet 2 object 208-2 transmits a processing completion notification of the PS print file to the RIP processing unit 205 (step S130).

Then, the sheet 2 object 208-2 transmits the RIP processing engine release notification to the RIP processing unit 205 (step S131). With this configuration, the RIP processing engine acquired in step S123 is released (i.e., assignment of the RIP processing engine to the sheet 2 object 208-2 is canceled).

Then, the object management unit 204 deletes the sheet 2 object 208-2 (step S132). With this configuration, the process of generating the RIP image of each page to be arranged on the second sheet and printing the second sheet arranged with the RIP images are completed.

Processing of Third Sheet:

Hereinafter, a description is given of a process of generating a RIP image of each page arranged on the third sheet and printing the third sheet arranged with the RIP images. Since the processing of the third sheet is substantially the same as the processing of the first sheet and the processing of the second sheet, the description thereof is omitted or simplified appropriately.

First, the object management unit 204 generates the sheet 3 object 208-3 (3rd sheet object 208-3 (step S133). The generation of the sheet 3 object 208-3 starts the process of generating the RIP image of each page to be arranged on the third sheet, and printing the third sheet arranged with the RIP images.

The sheet 3 object 208-3 transmits a RIP processing engine acquisition request to the RIP processing unit 205 (step S134).

When the RIP processing unit 205 receives the RIP processing engine acquisition request, the RIP processing unit 205 acquires at least one RIP processing engine corresponding to the acquisition request, and transmits the RIP processing engine acquired notification to the object management unit 204 (step S135).

Then, the sheet 3 object 208-3 transmits the processing start notification of the PS print file to the RIP processing unit 205 (step S136).

Then, the object management unit 204 transmits the PS print file included in the print job to the RIP processing unit 205 (step S137).

Then, the sheet 3 object 208-3 transmits a page layout acquisition request for acquiring one or more pages to be arranged on the third sheet to the page layout determination unit 203 (step S138). The page layout acquisition request includes "sheet 3 (3rd sheet)" indicating that the page number of the page(s) to be arranged on the third sheet is acquired. As a result, the page number "page 5, page 6, page 7, page 8" of the pages to be arranged on the third sheet is returned from the page layout determination unit 203.

Then, the sheet 3 object 208-3 transmits the processing request (i.e., page 5/page 6/page 7/page 8 processing request), designating the page number returned from the page layout determination unit 203 to the RIP processing unit 205 (step S139). As described above, the sheet 3 object 208-3 may transmit the processing request of the page to the RIP processing unit 205 for each page separately or individually.

When the RIP processing unit 205 generates the RIP image (raster image) in response to the processing request received from the sheet 3 object 208-3, the RIP processing unit 205 transmits the page 5/page 6/page 7/page 8 processing completion notification to the sheet 3 object 208-3 (step S140). As described above, the RIP processing unit 205 may transmit the page processing completion notification indicating that the generation of the RIP image of each page is completed for each one of pages to the sheet 3 object 208-3 separately or individually.

When the sheet 3 object 208-3 receives the page 5/page 6/page 7/page 8 processing completion notification, the sheet 3 object 208-3 transmits a print request to the print control unit 206 (step S141). With this configuration, the printer 30 is controlled by the print control apparatus 206, and the third sheet is printed on a recording medium such as paper based on the print setting included in the print job. When this printing is performed, the RIP image of page 5 on the back of the left side of the third sheet, a RIP image of the page 6 on the front of the left side of the third sheet, a RIP image of the page 7 on the front of the right side of the third sheet, and the RIP image of the page 8 on the back of the right side of the third sheet are printed on the recording medium as a printed matter by the printing apparatus 30, and then the printed matter is output from the printing apparatus 30.

Then, the sheet 3 object 208-3 transmits a processing completion notification of the PS print file to the RIP processing unit 205 (step S142).

Then, the sheet 3 object 208-3 transmits the RIP processing engine release notification to the RIP processing unit 205 (step S143). With this configuration, the RIP processing engine acquired in step S133 is released (i.e., assignment of the RIP processing engine to the sheet 3 object 208-3 is canceled).

Then, the object management unit 204 deletes the sheet 3 object 208-3 (step S144). With this configuration, the process of generating the RIP image of each page to be arranged on the third sheet and printing the third sheet arranged with the RIP images are completed.

When the processing of the last sheet (e.g., 3rd sheet) is completed, the object management unit 204 generates the EOJ object 209 (step S145), and then, the object management unit 204 deletes the EOJ object 209 (step S146). This completes the processing of the print job.

Order of Processing of Each Page by RIP Processing Unit:

As described above, when PostScript is used, PostScript requests that the processing (e.g., RIP processing or skip of RIP processing) is executed sequentially from the first page according to the language specification. In other words, in a case of using PostScript, after one page is processed, another page existing before the one page cannot be processed.

By contrast, as to the print control apparatus 20 of the embodiment, when the print target data including ten pages is to be printed by using the saddle stitch printing function, the RIP processing unit 205 processes each page on each sheet as follows.

Figure 7A:
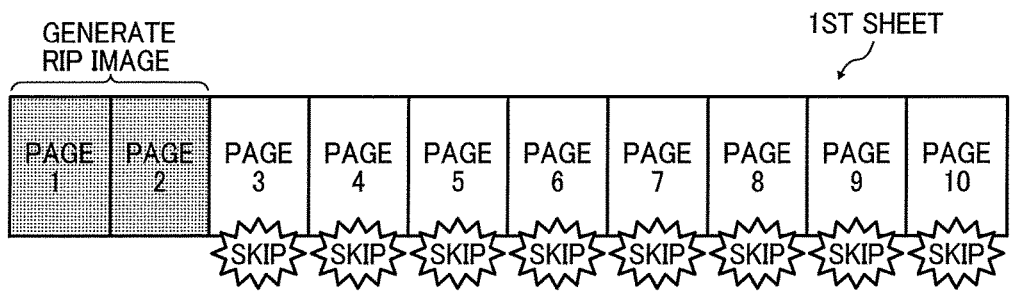
FIGS. 7A, 7B and 7C schematically illustrate an example of pages when RIP images are generated by using a saddle stitching printing function of the embodiment.

That is, as to the first sheet, as illustrated in FIG. 7A, after the RIP processing unit 205 sequentially generates the RIP image of page 1 and the RIP image of page 2, the RIP processing unit 205 skips the processing of page 3 and subsequent pages.

Figure 7B:
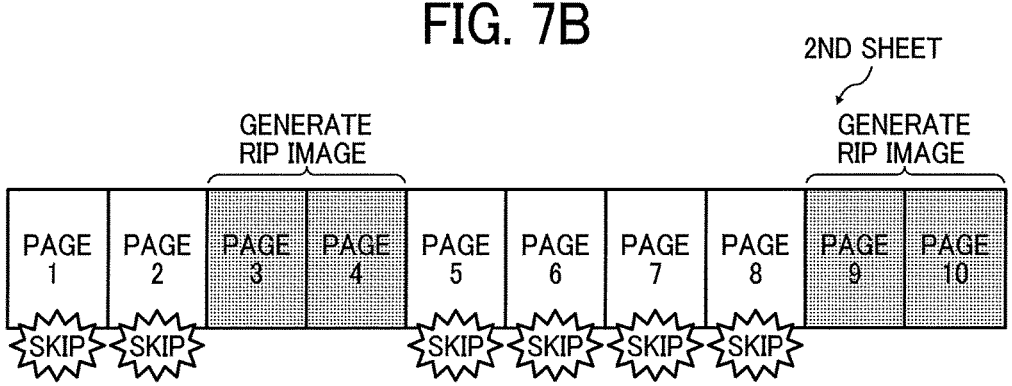

As to the second sheet, as illustrated in FIG. 7B, after the RIP processing unit 205 sequentially skips the processing of page 1 and page 2, the RIP processing unit 205 sequentially generates the RIP images of page 3 and the RIP image of page 4. Then, the RIP processing unit 205 sequentially skips the processing on page 5 to page 8, and then sequentially generates the RIP image of page 9 and the RIP image of page 10.

Figure 7C:
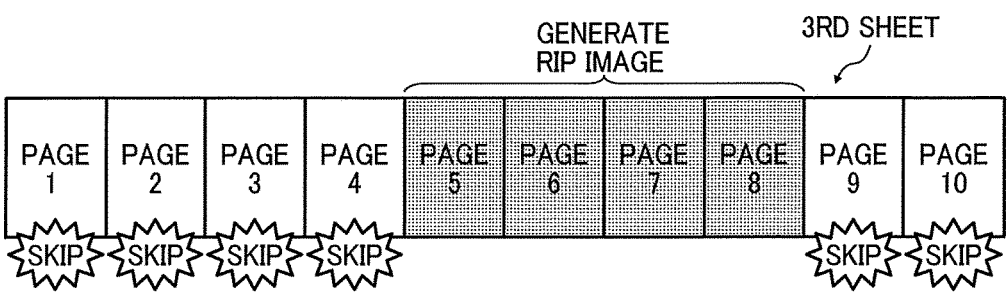

As to the third sheet, as illustrated in FIG. 7C, the RIP processing unit 205 skips the processing on page 1 to page 4 sequentially, sequentially generates the RIP images of page 5 to page 8, and then skips the processing on page 9 and page 10.

In this way, in the embodiment, the print control apparatus 20 generates one or more RIP images to be arranged on each specific sheet. With this configuration, in the embodiment, the print control apparatus 20 can control a printing operation using the saddle stitching printing function or the like without storing the RIP images of all pages in a memory such as the auxiliary storage device 24.

As described above, the print control apparatus 20 of the embodiment performs the generation of RIP image to be arranged on each one of the sheets, and printing of the sheets arranged with the RIP images for each sheet separately. With this configuration, in the embodiment, the print control apparatus 20 can arrange each page on recording media such as paper with a sequence order different from the sequential order of pages described in PDL such as PostScript, and perform the printing function. In particular, as to the print control apparatus 20, since the generation and printing of the RIP image is performed for each one of sheets, the printing function can be implemented even when there is no sufficient storage capacity in the RAM 23, the auxiliary storage device 24, or the like.

In FIGS. 6A, 6B, and 6C, the processing of the first sheet, the processing of the second sheet, and the processing of the third sheet are sequentially performed, but not limited thereto. For example, when a plurality of RIP processing engines is disposed, the processing of each one of sheets may be executed in parallel. For example, when two RIP processing engines are disposed, the processing of the first sheet and the processing of the second sheet may be executed in parallel.

Hereinafter, a description is given of a process executed by the object management unit 204 and the sheet object 208 of one of the sheets when the saddle printing function is implemented with reference to FIG. 8. FIG. 8 is a flowchart illustrating an example of the processing executed by the object management unit 204 and the sheet object 208 when the saddle stitch printing function is implemented according to the embodiment.

First, the sheet object 208 determines whether the RIP processing engine needs to be acquired for each one of sheets (step S201). That is, the sheet object 208 determines whether any one of the printing functions such as the saddle stitching printing function, the flat binding printing function, the speed imposition printing function, and the reverse order printing function is set for the print job. Specifically, the sheet object 208 may determine whether the RIP processing engine needs to be acquired for each one of sheets by referring to, for example, a determination result of the print job determination unit 202, or the sheet object 208 may determine whether the RIP processing engine needs to be acquired for each one of sheets by referring to the print setting information.

When the sheet object 208 determines that the RIP processing engine needs to be acquired for each one of sheets in step S201, the sheet object 208 transmits the RIP processing engine acquisition request to the RIP processing unit 205 (step S202).

On the other hand, when the sheet object 208 determines that the acquisition of RIP processing engine is not required each one of sheets in step S201, the sequence proceeds to step S206. In this case, the imposition is performed in the order described in PDL to perform the printing function.

After step S202, the sheet object 208 determines whether the sheet object 208 receives the RIP processing engine acquired notification from the RIP processing unit 205 (step S203).

If the RIP processing engine acquired notification is not yet received (S203: NO), the sheet object 208 waits until the sheet object 208 receives the RIP processing engine acquired notification. On the other hand, if the sheet object 208 receives the RIP processing engine acquired notification (S203: YES), the sheet object 208 transmits the processing start notification of the PS print file to the RIP processing unit 205 (step S204).

Then, the object management unit 204 transmits the PS print file to the RIP processing unit 205 (step S205).

Then, the sheet object 208 transmits the page layout acquisition request to the page layout determination unit 203 (step S206). As a result, the page number of the page(s) to be arranged on the sheet is obtained.

Then, the sheet object 208 transmits the page processing request designated by the page number acquired in step S206 to the RIP processing unit 205 (step S207). With this configuration, the RIP image of the page designated by the page number is generated by the RIP processing unit 205.

Then, the sheet object 208 determines whether the sheet object 208 receives the processing completion notification for all of the pages from the RIP processing unit 205 (step S208).

If the sheet object 208 has not yet received the processing completion notification of one or more pages (S208: NO), the sheet object 208 waits to receive the processing completion notification for all of the pages. On the other hand, when the sheet object 208 has received the processing completion notification for all of the pages (S208: YES), the sheet object 208 transmits the print request to the print control unit 206 (step S209).

Then, the sheet object 208 determines whether the RIP processing engine needs to be acquired for each one of sheets in the same manner as in step S201 (step S210).

When the sheet object 208 determines that the acquisition of the RIP processing engine is required for each one of sheets in step S210 (S210: YES), the processing completion notification of the PS print file is transmitted to the RIP processing unit 205 (step S211).

On the other hand, when the sheet object 208 determines that the acquisition of the RIP processing engine is not required for each one of sheets in step S210 (S210: NO), the sequence ends. In this case, the processing of the next sheet is started.

After step S211, the sheet object 208 transmits the RIP processing engine release notification to the RIP processing unit 205 (step S212).

As described above, the print control apparatus 20 generates one or more RIP images to be arranged to each one of sheets, and controls the printing of each one of the sheets arranged with the RIP images on a recording medium such as paper by using the printing apparatus 30. With this configuration, in the embodiment, the print control apparatus 20 can arrange each page on recording media with a sequential order different from the sequential order of pages described in PDL such as PostScript, and perform the printing function by using printing apparatus 30. In particular, as to the print control apparatus 20, since the generation and printing of the RIP image is performed for each one of sheets, the printing function can be implemented even when there is no sufficient storage capacity in a memory such as the RAM 23 and the auxiliary storage device 24.

In the above described embodiment, the number of impositions per face is two (i.e., 2-up), but the number of impositions is not limited thereto. For example, the above described embodiment can be similarly applied when the number of impositions per face is "N" (i.e., N-up).

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. A print control apparatus comprising:
   circuitry to
   receive a print job from a terminal device connected to the print control apparatus via a network;
   determine whether the print job is set with a specific printing function that performs a printing operation of the print job on one or more recording media and has a page order that is different from an initial page order described in a page description language;
   determine one or more page data to be arranged on one or more virtual sheets, the one or more virtual sheets corresponding to the one or more recording media on a one-to-one basis, when the print job is determined to be set with the specific printing function;
   generate one or more raster images, corresponding to the one or more page data on a one-to-one basis, to be arranged on the one or more virtual sheets from print data included in the print job;
   arrange the generated one or more raster images on the one or more virtual sheets based on the page order different from the initial page order described in the page description language; and
   control an operation of printing the one or more virtual sheets, each arranged with the generated one or more raster images corresponding to the one or more page data on the one-to-one basis, on the one or more recording media.

2. The print control apparatus of claim 1,
   wherein the circuitry is further configured to acquire a raster image processing engine for each one of the one or more virtual sheets, the raster image processing engine being used to generate the one or more raster images, corresponding to the one or more page data and to be arranged on each one of the one or more virtual sheets,
   the circuitry is further configured to generate the one or more raster images to be arranged on the one or more virtual sheets by using the raster image processing engine acquired for each one of the one or more virtual sheets, and
   the circuitry is further configured to release the raster image processing engine acquired for each one of the one or more virtual sheets after the circuitry completes the control of the operation of printing the one or more virtual sheets on the corresponding one or more recording media.

3. The print control apparatus of claim 2,
   wherein the print data is a print file described in the page description language,
   the circuitry is further configured to open the print file after the circuitry acquires the raster image processing engine, and
   the circuitry is further configured to close the print file before releasing the raster image processing engine.

4. The print control apparatus of claim 1, wherein the circuitry is further configured to determine whether any one of printing functions including a saddle stitching printing function, a flat binding printing function, a speed imposition printing function, and a reverse order printing function is set as the specific printing function for the print job.

5. The print control apparatus of claim 1, wherein the page description language is PostScript.

6. A method of controlling a printing operation, comprising:
   receiving a print job from a terminal device connected to a network;
   determining whether the print job is set with a specific printing function that performs a printing operation of the print job on one or more recording media and has a page order that is different from an initial page order described in a page description language;
   determining one or more page data to be arranged on one or more virtual sheets, the one or more virtual sheets corresponding to the one or more recording media on a one-to-one basis, when the print job is determined to be set with the specific printing function;
   generating one or more raster images, corresponding to the one or more page data on a one-to-one basis, to be arranged on the one or more virtual sheets from print data included in the print job;
   arranging the generated one or more raster images on the one or more virtual sheets based on the page order different from the initial page order described in the page description language; and
   controlling an operation of printing the one or more virtual sheets, each arranged with the generated one or more raster images corresponding to the one or more page data on the one-to-one basis, on the one or more recording media.

7. A non-transitory storage medium storing one or more instructions that, when executed by one or more processors, cause the one or more processors to execute a method of controlling a printing operation, the method comprising:

receiving a print job from a terminal device connected to a network;

determining whether the print job is set with a specific printing function that performs a printing operation of the print job on one or more recording media and has a page order that is different from an initial page order described in a page description language;

determining one or more page data to be arranged on one or more virtual sheets, the one or more virtual sheets corresponding to the one or more recording media on a one-to-one basis, when the print job is determined to be set with the specific printing function;

generating one or more raster images, corresponding to the one or more page data on a one-to-one basis, to be arranged on the one or more virtual sheets from print data included in the print job;

arranging the generated one or more raster images on the one or more virtual sheets based on the page order different from the initial page order described in the page description language; and controlling an operation of printing the one or more virtual sheets, each arranged with the generated one or more raster images corresponding to the one or more page data on the one-to-one basis, on the one or more recording media.

* * * * *